Plate 2

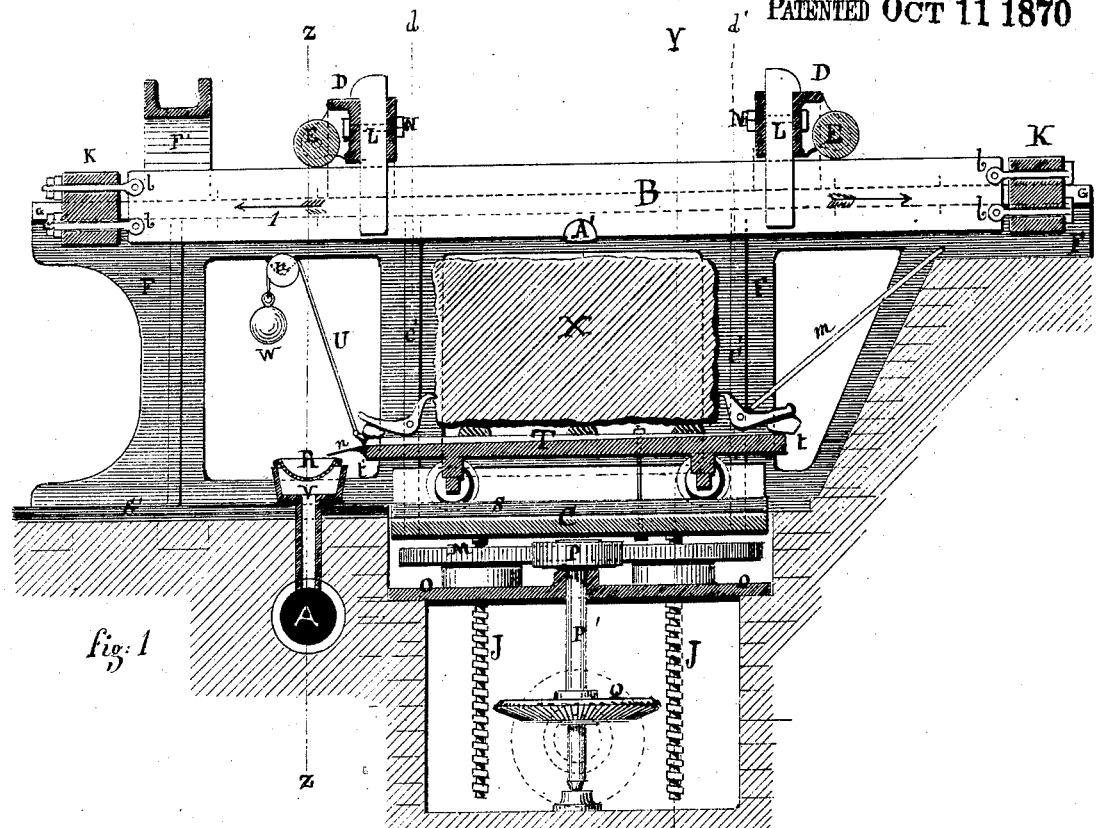
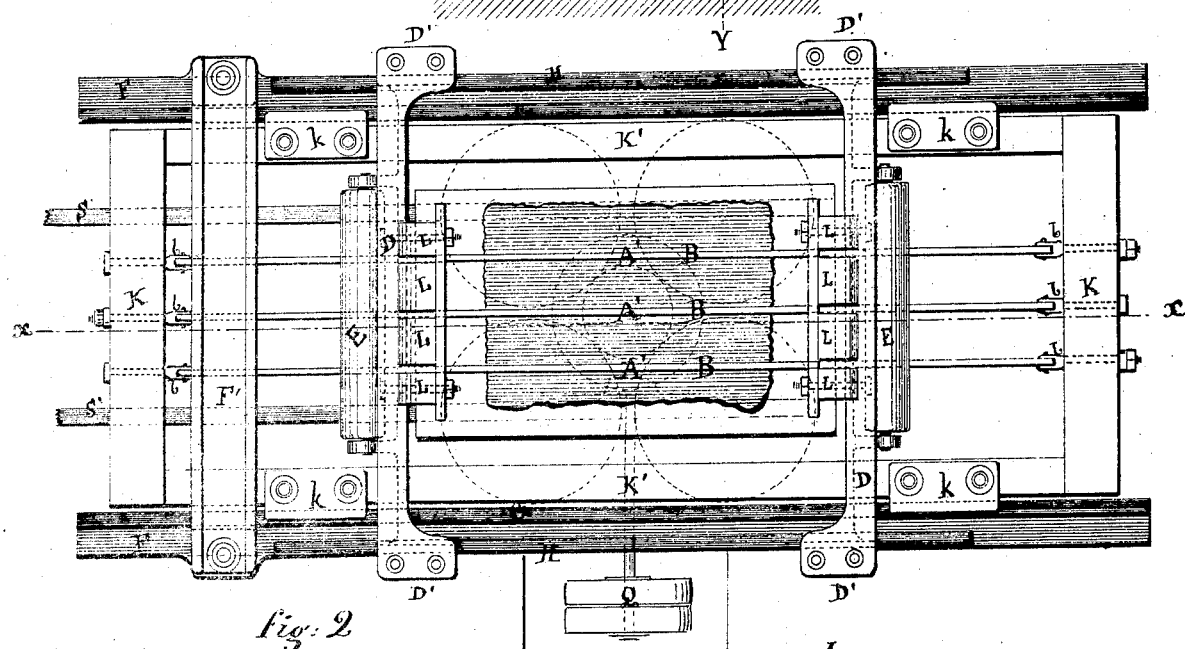

Hugh Young and James L. Young,
Stone Cutting Machine.

Witnesses
Thom E Crosto
Frank E Crosto

Inventors.
Hugh Young
James L. Young weight:bold;">United States Patent Office.

HUGH YOUNG, OF MIDDLETOWN, CONNECTICUT, AND JAMES L. YOUNG, OF NEW YORK, N. Y.

Letters Patent No. 108,228, dated October 11, 1870; antedated October 1, 1870.

IMPROVEMENT IN STONE-CUTTING MACHINES.

The Schedule referred to in these Letters Patent and making part of the same.

We, HUGH YOUNG, of Middletown, in the county of Middlesex and State of Connecticut, and JAMES L. YOUNG, of New York, in the county and State of New York, have invented certain Improvements in Stone-cutting Machines, of which the following is a specification.

Nature and Objects of the Invention.

This invention relates to a stone-cutting machine, more especially intended to divide large blocks of stones into slabs or sheets; and It consists in a diamond or other hard stone, or of a cluster of diamonds, or other hard stones, as a tool, or of a tool or cutter, armed with a diamond or other hard stone, or by a cluster or clusters of diamonds or other hard stones, in combination with a blade or guiding-sheet, of metal, mounted in a machine so as to receive a rectilinear motion in the line of the cut to be made in the stone, said motion or stroke being of sufficient length as to allow of the tool passing out of the cut made thereby at both ends of the cut at each stroke of the machine, the stone to be cut being fed to said tool, or the tool being fed to the stone by proper machinery.

Heretofore, when attempts have been made to divide hard stones into slabs by other means than cleavage, or by the process of grinding with metallic blades and silicious sand, recourse has been had to saws armed with diamonds, so as to obtain sufficient endurance to resist the action of the stone.

The circular saw so armed is well adapted to certain kinds of work, but is not available for making cuts of any great depth. Gang-saws, armed with diamonds, have been tried, but these present, among others, two great difficulties which have prevented their successful operation in the cutting of stones.

The first of these difficulties is getting clear of the debris. This may be met in using a saw, by making it to cut only in one direction, and giving the saw a lifting back motion or lead; but then the debris is shoved, by one tooth or set of teeth after another, until it finds its way out at one end of the cut, but making much unnecessary wear of the teeth and blade in its passage, and there is, besides, the loss of power and time in producing the back motion. If, on the other hand, the teeth should be made to cut both ways, the debris would be shifted backward and forward in the cut until it would entirely choke the action of the saw.

The second difficulty is the impossibility, in practice, of having each tooth cut exactly alike, and the saw, therefore, exhibits, for result, a cut having ridges, breaks, or creases running at right angles with the motion of the saw.

We might mention, also, in passing, the liability of the teeth being broken, of diamonds becoming loose, &c. This happening to such of the teeth or diamonds as do not come out of the stone at any part of the stroke, there would be no opportunity either of observing or repairing the loss but by removing the saw entirely up out of the cut.

To obviate these and other difficulties we have invented the present stone-cutting machine, whose type and main feature is that of a diamond-tool, or diamond-armed tool, which, at every, stroke, is made to plow right through the entire length of the cut, pushing the debris before it, and is made to pass out of the cut or channel made by said plowing action at each end of said cut or channel, and at each stroke of the machine. The stone being fed regularly to the said tool, will soon be divided, and present two perfectly-straight and smooth surfaces.

Description of Drawing.

PLATE I.

Figure 1 represents a sectional longitudinal view, in elevation, of one of our improved stone-cutting machines, through X X.

Figure 2 is a top view or plan of the same.

PLATE II.

Figure 3:
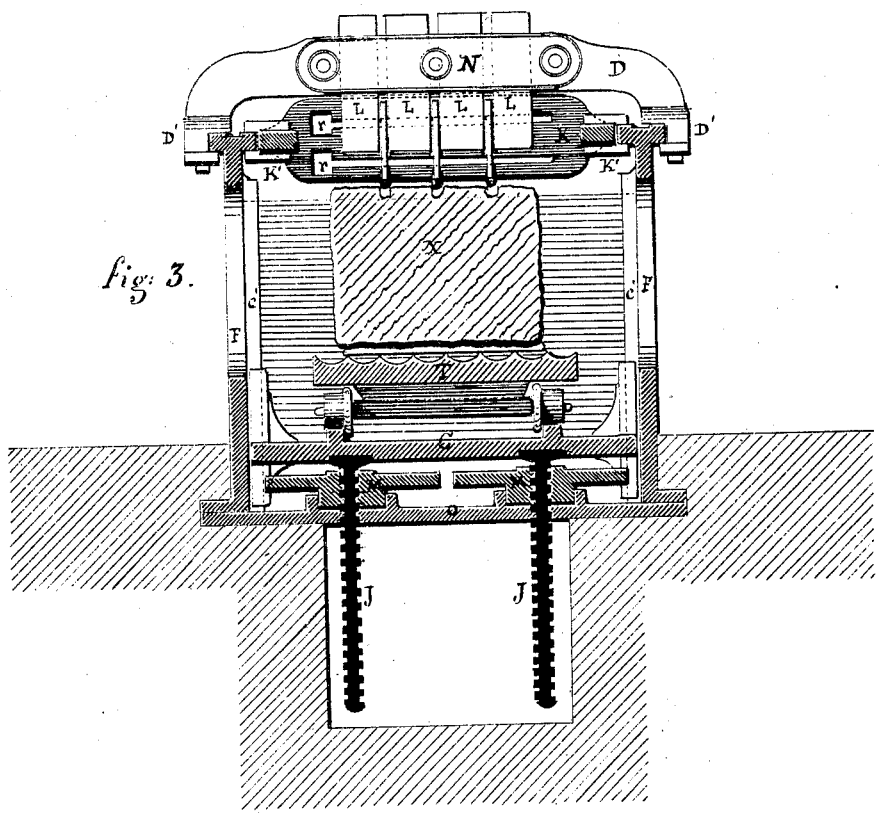
Figure 4:
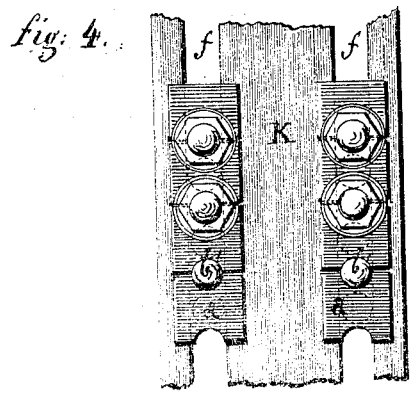
Figure 5:
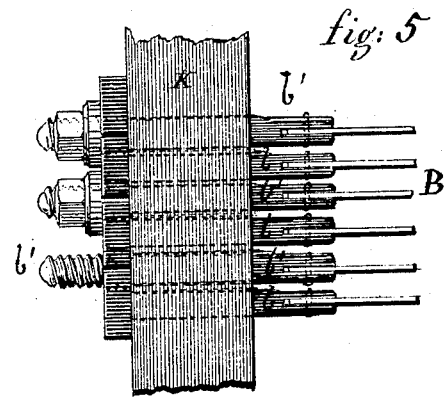

Figure 3 is a transversal sectional elevation of the same machine through Y Y, and Figure 4 and 5 are details, explained further in the specification.

General Description.

F is the frame of the machine, which should be made in a substantial manner, to resist the vibration of the operating parts, and be provided, in its upper part, with the four slides G G and H H perfectly parallel with each other.

K K' K K' is a frame, composed of the two ends K K and the two sides K' K', strongly fastened together.

The two pieces K K have two longitudinal slots, $ff$, cut therein, with enlarged places, $r\ r$, for passing the heads of the bolts $c$ which are used, as hereafter explained.

The frame K K' K K' is mounted upon jaws, $k$, provided with suitable brasses to work upon and between the slides G G, so that said frame can move freely, yet with perfect accuracy, in a rectilinear manner, in the direction of the arrows 1 and 2 of fig. 1;

and it is provided with any suitable mechanical devices to impart such movement to it, either by direct action thereon of the piston-rod of a steam or air-engine, or by any other mode.

B is the guiding-blade, mounted in the frame K K' K K', and carrying the diamond-tool or diamond-armed tool A'. As many of these blades B may be placed side by side in the frame as it is desired to make cuts in the stone or stones, and at such distance apart as may be required.

The tool A' may be made of any improved or ordinary and known shape or construction, and it may consist simply of a diamond or other hard stone, or of a cluster of diamonds or other hard stones, or it may consist of a block in which a diamond or other hard stone, or a cluster of diamonds or other hard stones is set, the only essential thing being that the diamond or cluster of diamonds shall be sufficient for cutting the required channel, and that, when a cluster of diamonds is used, the two or more diamonds forming it shall be in such proximity and bear such relation to each other as to form, essentially, one tool, to be used for plowing from end to end, and in both directions of the cut, as already stated.

We deem it necessary that the blade B should be of sufficient width to insure a steady, rigid action, and, as the blade has to be made thin not to waste stone unnecessarily, we provide it with four bolts, $b$ $b$ and $b'$ $b'$, two near the top and two near the bottom thereof, so that we may regulate the tension, and take out any twist or winding therein.

When, for some special purpose, it is desirable that several blades B be set close to each other, to form a gang and divide a block of stone into thin slabs, (as is often the case for marble,) then we employ, for stretching the blades B, bolts, $b$, having heads shaped as shown in fig. 4 by the letter $a$, so that the two heads of the bolts $b$ will serve as a washer for an intermediary bolt, $b'$. By this arrangement of bolts we are enabled to place our blades B as close together as the shank of the bolts $b$ and $b'$ will allow them to come together, and yet retain the whole of the strength of said bolts.

D D are two bridges resting upon the slides H H, adjustable thereon, to suit the length of the stone to be cut, and having for object to maintain and guide, in their proper plane of motion, the blade or blades B, as close as practicable to said stone, and to the point of resistance of the tool A'.

For that purpose the two bridges D D are provided with any suitable devices for guiding the blades B. We have illustrated the one we now employ, which is the rollers E E, to prevent the rising of the blades, and the blocks of wood L L L, &c., clasped between the bridges D D and plates N fastened thereto, to guide the blades B on the side; but we contemplate that other modes of guiding the blades may be used; as, for example, vertical rollers, working in swivel-frames, held in such position as to give the required width between the blades, for guiding the same, instead of the blocks L.

C is a platform, mounted between vertical guides or slides, C' C', in such a manner as to be capable of being moved vertically between said slides, and have no play or horizontal motion.

J are screws, which, being fastened to the platform C, and running through nuts in the hubs of the wheels M, serve the purpose of raising and lowering the platform C.

The wheels M are connected among themselves, and acted upon by any suitable set of gearings, &c., in such a manner as to receive motion in either direction from the same motive-power employed for moving the frame K K' K K', or from a separate and distinct source of power, as best suited to the purposes, and the motion of the platform C is intended to feed the stone placed thereon to the tool or tools A' of the blade or blades B.

O is the frame or plate upon which rest the wheels M.

S' S', rails of a railroad.

S S, rails fastened to the platform C, and matching the railroad S' S'.

T is a truck, running upon the rails S' S' and S S, and having its bed corrugated and inclined from $t$ to $t'$, where it has the lip or apron $n$, so that all water falling from the stone upon the truck will be carried over said lip $n$, and, falling in the trough V, will pass into the sewer A.

R is a filter or sieve, placed in the trough V, or in any suitable place between the stone to be cut and the sewer, or other place where the water is wasted, and serving the purpose of retaining any fragments of diamonds which may become detached from the cutter or cutters A'.

U is a flexible apron, attached to the truck T at bottom, passing over the roller $u$, and kept stretched by the weight W.

$m$ is an apron, which may be used for the same purpose as U, being only a plain or corrugated panel, resting upon the truck T, and upon any fixed points of the frame F. Both these aprons, or any modification thereof, are intended to prevent any water being projected away from the truck T, and, by acting as a guard, collect any fragments of diamonds which may be with such water, as already stated.

The stone to be cut is loaded on and properly secured to the truck T, which, being brought by the railway S' S' onto the platform C, is fastened thereto by any approved mode, in our illustration, by bolting.

The frame K K' K K' is now put in motion, with a stroke of such a length as to bring the tool A', at each stroke, from the dotted line $d$ to the dotted line $d'$; and the feed-motion being started, the platform C, truck T, and stone X, secured thereon, will be fed gradually to the tool A', which, at every stroke, will plow right through the whole length of the stone to be cut, and pass out of the same at each and every stroke of the said tool A'.

We deem this making the tool A' to pass out of the stone at each stroke, necessary, to obtain perfectly straight and even work, and of great service in keeping the cut free from debris; and we deem it of the greatest consequence that the cutter A' shall pass entirely out of the cut at, at least, one of the ends thereof, so that the cutter may be examined, repaired, or changed without lowering the stone, or raising the saw, to take it entirely out of the cut.

We contemplate that water shall be used in each cut, during the operation of the machine, not only for the purpose of keeping the diamond-tool from heating, but also to assist in clearing out the debris.

Claims.

1. The combination of the cutter A' with the blade B, in the manner and for the purpose set forth.

2. The combination of the frame K K' K K' and frame F with one or more blades B, carrying the cutter or cutters A', substantially in the manner and for the purpose specified.

3. The bridges D, having their rollers E, blocks L L L, &c., or equivalent guides, in combination with the blade or blades B, when said bridges are adjustable by means of ways, the whole constructed to operate in the manner and for the purpose described.

4. The combination of the platform C, slides C', screws J, wheels M with the tool A' and blade B, the whole arranged so as to give a feed-motion of the stone to the tool A, working in the manner set forth.

5. As a new means of cutting stone, a tool, consisting of one or more diamonds, or other hard stones, mounted upon a rectilinear-moving blade, operated in such a manner, in relation to the stone to be cut, that said tool will plow a channel into said stone, and pass out at either end of said channel at each complete stroke of the blade and tool, substantially in the manner herein set forth.

6. The bolts $b$, having heads $a$, in combination with the bolts $b'$ and blade or blades B, bearing the cutter A', or cutters A', arranged substantially as and for the purpose specified.

7. The sieve R, when used in combination with the horizontal rectilinear-moving diamond-tool A', or tools A', and blade or blades B, substantially in the manner and for the purpose set forth.

HUGH YOUNG.
JAMES L. YOUNG.

Witnesses:
  MOSES E. CRASTO,
  FRANK P. CRASTO.